2 Sheets--Sheet 1.
T. COX & W. HOLLAND.
Manufacture of Runners and Top-Notches for Umbrellas.
No. 135,321. Patented Jan. 28, 1873.
FIG. I
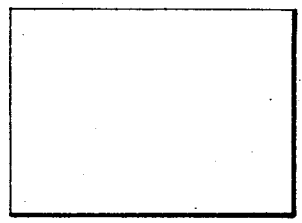
FIG. II
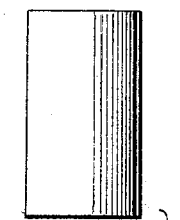
FIG. III
FIG. V
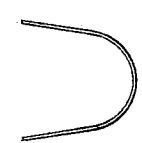
FIG. IV
FIG. VI
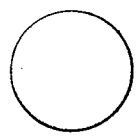
FIG. VII
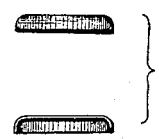
FIG. VIII
FIG. IX
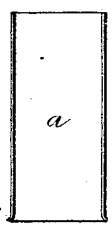
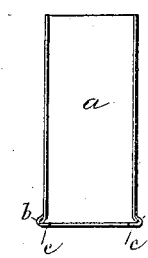
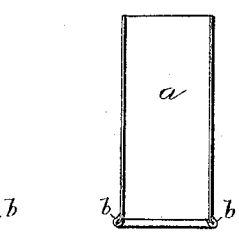
Witnesses,
George Shaw
Richard Skerrett
Inventors
Thomas Cox
William Holland
AM. PHOTO-LITHOGRAPHIC CO. N.Y. (OSBORNE'S PROCESS.)

2 Sheets--Sheet 2.
T. COX & W. HOLLAND.
Manufacture of Runners and Top-Notches for Umbrellas.
No. 135,321.                              Patented Jan. 28, 1873.
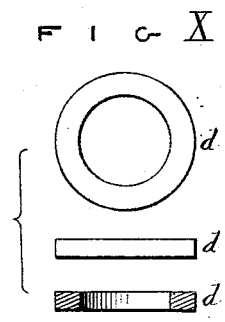
FIG. X
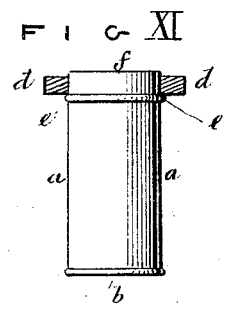
FIG. XI
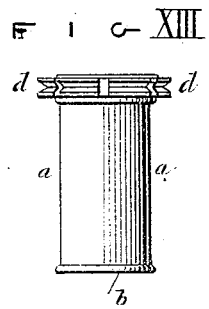
FIG. XIII
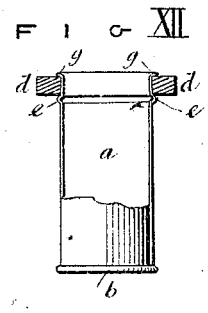
FIG. XII
Witnesses,
George Shaw
Richard Skerrett
Inventors
Thomas Cox
William Holland

UNITED STATES PATENT OFFICE.

THOMAS COX AND WILLIAM HOLLAND, OF BIRMINGHAM, ENGLAND.

IMPROVEMENT IN THE MANUFACTURE OF RUNNERS AND TOP-NOTCHES FOR UMBRELLAS.

Specification forming part of Letters Patent No. 135,321, dated January 28, 1873.

*To all whom it may concern:*

Be it known that we, THOMAS COX and WILLIAM HOLLAND, of the firm of Cox Brothers and Holland, of Birmingham, in the county of Warwick, England, manufacturers, have invented certain Improvements in the Manufacture of Runners and Top-Notches for Umbrellas and Parasols, of which the following is a specification:

Our invention consists in making the said runners and top-notches by the process or combination of processes hereinafter described and illustrated in the accompanying drawing.

We will describe our invention as applied to the manufacture of a runner, the manufacture of a top-notch according to our invention differing from the manufacture of a runner in no essential respect.

The said runner consists of three parts—the tube or barrel; the notch on its upper end, to which the stretchers are jointed; and the bead at the lower end, by which the lower edge of the tube or barrel is inclosed and strengthened. The tube or barrel of the runner is raised by ordinary raising-tools into a cylindrical form from a flat blank of sheet metal. The ring at the top of the runner tube or barrel, from which the notch is made, and the bead at the bottom of the said runner-tube are placed upon and temporarily fitted in their respective positions on the tube by ordinary tools and processes; and the parts thus fitted together are soldered or firmly connected to the tube or barrel in the manner hereinafter described. The manner in which the runner tube or barrel is made and the bead and notch-ring fitted in their places on the said tube or barrel is illustrated in the accompanying drawing.

Figure 1 represents the blank from which the runner tube or barrel is made. By means of raising-tools the said blank is first brought into the trough form, Fig. 2, and afterward into the tubular or cylindrical form, Fig. 3. The bead at the lower edge of the runner-tube is made from the cupped blank, Fig. 4, the said cupped blank being raised by a pair of dies from the flat disk, Fig. 5.

The bead of the runner-tube $a$ is made from the cupped blank, Fig. 4, and fitted on the said runner-tube in the following manner: The end of the runner-tube to receive the bead is expanded or coned, as represented in Fig. 6, and upon the said expanded or coned end the cupped blank is placed and pressed or closed thereon, as illustrated in Fig. 7. A circular piece or disk is next pierced or cut from the interior of the partly-made bead $b$, as illustrated in Fig. 8, and the inner edge $c$ of the said bead $b$ is pressed inward or spun upon the runner-tube, as illustrated in Fig. 9. The bead $b$ is thus made and fitted in its place on the lower edge of the runner tube or barrel $a$. In order to fit the notch-ring $d$, shown in Fig. 10, upon the top end of the runner-tube $a$, an annular shoulder is first made by pressing tools upon the said tube and the notch-ring $d$ placed upon and supported by the said shoulder, as illustrated in Fig. 11, where the notch-ring is marked $d$ and the supporting-shoulder is marked $e$. The projecting edge $f$ of the runner-tube $a$ is next expanded outward and closed upon the top face of the notch-ring $d$, as illustrated in Fig. 12, where the closed edge of the runner-tube is marked $g$. The notch-ring $d$ is thus fitted in its proper position on the upper end of the runner tube or barrel $a$. In order to solder or firmly connect the parts $a$, $b$, and $d$ together we immerse for a short time the partially-made runner or combined tube, notch-ring, and bead in a bath of melted zinc, the said partially-made runner having been previously cleaned by the pickling or dipping process, and otherwise heated with respect to its immersion in the bath of melted zinc as articles are treated in the ordinary galvanizing process. By the immersion of the partially-made runner in the bath of melted zinc the notch-ring $d$ and bead $b$ are firmly connected with or soldered to the runner-tube $a$. The said runner-tube is turned in a lathe and the zinc adhering to the external parts of the said tube removed. The ring $d$ is next converted into a notch, and is finished by the turning and other processes. The runner is finally japanned and stoved in the ordinary manner.

Fig. 13 represents the completed runner, made as hereinbefore described.

In making a top-notch according to our invention the parts are fitted upon the top-notch tube and treated with the zinc-bath in the manner described with respect to a runner.

Instead of immersing the combined tube, notch-ring, and bead in the bath of melted zinc the said combined parts may be plunged into the bath only to such a depth as is sufficient to cover with the melted zinc the notch-ring $d$ and bead $e$, the article being held in that position until it has acquired the temperature of the bath. By the method of treatment last described there is not so much superfluous metal to be removed from the tube $a$ as when the article is wholly immersed in the bath of melted zinc.

Although we prefer to employ a bath of melted zinc or alloy of zinc to solder or connect the parts of the runner and top-notch together, (and which bath we have found to answer well in practice,) yet a bath of melted tin or melted lead and tin, or of common solder, or other metallic alloy fusible at the same or nearly the same temperature, may be employed.

By our improvements the runners and top-notches are made very economically, and the notches of the said runners and top-notches are as effectually secured to the tubes as by the more troublesome process of hand-brazing, while they are much stronger and bear the stoving process much better than the runners and notches made by the ordinary soft-soldering process.

Having now described the nature of our invention and the manner in which the same is to be performed, we wish it to be understood that we do not limit ourselves to the precise details herein described and illustrated, as the same may be varied without departing from the nature of our invention; but

We claim as our invention—

The improvements in the manufacture of runners and top-notches for umbrellas and parasols hereinbefore described and illustrated in the accompanying drawing—that is to say, temporarily fitting the notch-ring and bead of the runner in their places on the runner tube or barrel and the notch-ring on the top-notch tube, substantially in the manner described and illustrated, and soldering or firmly connecting the parts together by immersing or partly immersing the combined article or partly-made runner or top-notch in a bath of melted zinc, or of the other metals or alloys hereinbefore enumerated.

THOMAS COX. [L. S.]
WILLIAM HOLLAND. [L. S.]

Witnesses:
GEORGE SHAW,
RICHARD SKERRETT,
37 Temple street, Birmingham.